United States Patent [19]

Stober et al.

[11] Patent Number: 4,940,784

[45] Date of Patent: Jul. 10, 1990

[54] METHOD FOR THE DRY CATIONIZATION OF GALACTOMANNANS (II)

[75] Inventors: Reinhard Stober, Hasselroth; Wolfgang Fischer, Kahl; Michael Huss, Eschborn; Reimund Pieter, Wetzlar, all of Fed. Rep. of Germany

[73] Assignee: Degussa Aktiengesellschaft, Frankfurt, Fed. Rep. of Germany

[21] Appl. No.: 227,298

[22] Filed: Aug. 2, 1988

[30] Foreign Application Priority Data

Aug. 13, 1987 [DE] Fed. Rep. of Germany ....... 3726984

[51] Int. Cl.$^5$ .............................................. C08B 37/00
[52] U.S. Cl. ..................................................... 536/1.1
[58] Field of Search ......................................... 536/1.1

[56] References Cited

U.S. PATENT DOCUMENTS 3,346,563 10/1967 Shildneck et al. .................... 536/50

FOREIGN PATENT DOCUMENTS 1136842 3/1965 United Kingdom .................... 536/1

Primary Examiner—John Kight, III
Assistant Examiner—Carlos Aspuru

[57] ABSTRACT

A method is disclosed for the dry cationization of galactomannans by means of reaction with alkylene epoxides in an alkaline medium in the presence of water at 5° to 60° and in the presence of a finely divided, hydrophilic silica.

13 Claims, No Drawings

METHOD FOR THE DRY CATIONIZATION OF GALACTOMANNANS (II)

INTRODUCTION AND BACKGROUND

The present invention relates to a dry method for the preparation of cationic galactomannans by means of reaction with alkylene epoxides in the presence of water in an alkaline medium.

Galactomannans are an important group of vegetable hydrocolloids which occur as reserve carbohydrates, analogous to starch, especially in the seed endosperm of many Leguminosae (legumes). However, only guaran (guar gum) and carubin (fine carob [Saint John's bread] flour) are of practical industrial significance. Guaran occurs in the endosperm of guar beans (*Cyamopsis tetragonoloba* L.), which belong to the order of Leguminosae, family Papilionaceae. Guar is an old cultivated plant which is cultivated today especially in India, Pakistan and Texas on a large scale.

Guaran contains 64% mannose and 36% galactose. The mannose structural elements linked in a beta-(1,4)-glycosidic bond form long, unbranched chains to which individual galactose molecules are attached in alpha-(1,6)-bonds. Both mannose as well as galactose are present in pyranose form. The average molecular weight of guaran is around 220000. Guaran is soluble in cold water.

Native and modified galactomannans based on fine guar flours and fine carob flours are used industrially today in many different areas, e.g. in the petroleum, textile, paper, food, pharmaceutical, cosmetic and explosives industries as well as in mining and in water treatment. The native galactomannans have been known for years in the manufacture of paper as a "wet end additive" for increasing paper strengths. As a result of modification, the properties of the products can be reinforced or products with completely new properties can be created.

In order to improve the natural affinity of galactomannans for cellulose and thus be able to achieve a better retention of the fine fibers, there is the possibility of cationizing galactomannans.

European Pat. No. A0 146 911 discloses a method in which 2,3-epoxypropyltrimethyl ammonium chloride is reacted in an alkaline, aqueous medium at 52° C.

According to European Pat. No. A0 130 946, this reaction is likewise performed in an alkaline medium which, however, contains sodium tetraborate in addition and is partially neutralized by acetic acid before the addition of the cationizing reagent.

Great Britian Pat. No. 1,136,842 contains more precise data about products like those obtained in the reaction of 2,3-epoxypropyltrimethyl ammonium chloride with galactomannans in an alkaline, aqueous medium.

According to these publications, the cationized product must be dried, then ground and sieved before further usage.

SUMMARY OF THE INVENTION

It is an object of the present invention to provide a method for the preparation of cationized galactomannans in which agitating energy is expended only briefly and the cationized galactomannans can be utilized without additional aftertreatment (sieving, drying, etc.).

In attaining this and other objects of the invention, a feature of the invention resides in a method for the dry cationization by means of reaction of galactomannans with alkylene epoxides in an alkaline medium in the presence of water the reaction is carried out at 5° to 60° C. in the presence of a fine, hydrophilic silica and an alkaline material selected from the group consisting of alkali metal silicates and/or alkali metal aluminates or of a mixture of alkali metal hydroxides or oxides or alkaline earth metal hydroxides or oxides and alkali metal carbonates or of a mixture of one or more of these hydroxides, oxides or carbonates with an alkali metal silicate and/or alkali metal aluminate.

The pH of a galactomannan modified in this manner is equal to, or greater than, 9 (1% by weight solution).

DETAILED DESCRIPTION OF THE INVENTION

Native or modified galactomannans or substances of any origin containing galactomannans can be used for the preparation of cationic galactomannans according to the method of the invention. Native fine guar flour is used with particular advantage.

The etherification of the of the galactomannans is performed according to the invention with alkylene epoxides known in the art of the general formula

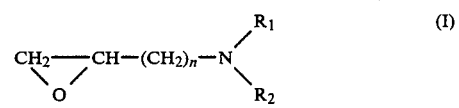

or preferably

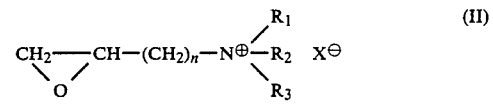

in which n is a number from 1 to 3 and $R_1$, $R_2$ and $R_3$ signify the same or different alkyl groups with 1 to 4 carbon atoms or $R_1$ is benzyl and $X^\ominus$ signifies chloride, bromide, sulfate or acetate. 2,3-epoxypropyltrimethyl ammonium chloride is preferred.

A variant of the method of the invention can be carried out by allowing the reaction with the above-mentioned epoxides to occur in the presence of 0.5 to 5% by wt. of a compound which corresponds to one of the following formulas:

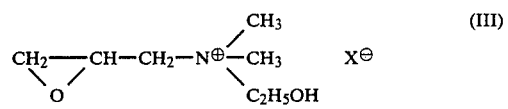

or

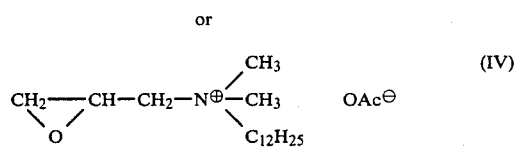

or

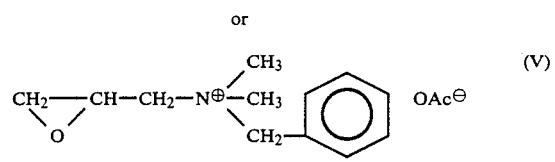

These compounds are preferably used in a mixture with the epoxides according to formulas (I) or (II) and can also be present therein in the form of the associated chlorohydrins.

The conversion to the epoxides corresponding to formulas (III) to (v), which react with the galactomannans, then occurs at the latest in the reaction medium. Mixtures of this type are prepared with advantage by using the amounts of the corresponding tertiary amines necessary for forming the portions of the epoxides specified in accordance with the invention with formulas (III) to (Y) in the preparation of the epoxides with formulas (I) and (II), as is described e.g. in U.S. Pat. No. 3,135,782.

These epoxides or chlorohydrins can also be separately prepared and mixed with the epoxides according to formulas (I) or (II) in the specified proportion.

It is generally advantageous to use approximately 0.005 to 0.5 mole epoxide, preferably 0.05 to 0.30 mole epoxide, per mole galactomannan, calculated as anhydroglucose unit (molar mass 162.15) in the dry substance.

The specific surfaces of the finely divided silicas used are between 60 and 700 m$^2$/g preferably 100 and 450 m$^2$/g (BET measurement according to DIN 66131, N2 adsorption at the temperature of liquid nitrogen, preceding heating of the specimen at 110° C.). These products are known in the art.

These silicas are used in an amount of 0.1 to 3.0, preferably 1.0 to 2.0% by wt. in relation to the galactomannan (bone-dry).

It is preferable to use hydrophilic, precipitated silicas with a specific surface of 190 to 450 m$^2$/g especially a spray-dried, precipitated silicic acid with a specific surface of 190 m$^2$/g.

According to the invention, the reaction mixture contains the alkaline acting substance(s) mentioned above especially an alkali metal metasilicate and/or alkali metal aluminate, in an amount of amount of 0.5 to 8.0% by wt., especially 1.5 to 4.5% by wt., and 10 to 60% by wt., preferably 20 to 30% by wt. water, all values in relation to the amount of galactomannan (bone-dry) added.

Mixtures of alkali metal hydroxides or oxides or alkaline earth metal hydroxides or oxides and alkali metal carbonates can also be used. Mixtures of one or more of these oxides, hydroxides or carbonates with an alkali metal silicate and/or alkali metal aluminate are also suitable The term "alkali" as used herein signifies in particular sodium or potassium, and the term "alkaline earth metal" in particular signifies calcium.

Sodium metasilicate is used in particular as the silicate.

In an especially suitable embodiment the alkaline acting substance is used in the combined form of a powdery mixture with finely divided, hydrophilic silica. This combination is called "activator" in the following text.

The activator consists of 10 to 50% silica and 90 to 50% by wt. of these alkaline substances.

The following procedure is used in accordance with the invention: The mixture of galactomannan, alkaline acting substance(s), silica and alkylene epoxide, which is generally added as aqueous solution, is homogenized in an intensive, high-efficiency, mixer.

The epoxide solution is finely distributed with advantage and added to, preferably sprayed onto the galactomannan present in commercial form with a water content of approximately 7 to 15% by wt.

The alkaline acting substance(s) and the silica can be added to the galactomannan either before or after.

The powdery activator is preferably mixed with the galactomannan before the addition of the epoxide solution. The epoxide solution and the alkaline component can also be added simultaneously into the mixing unit.

The mixture which accumulates during the preparation of the epoxide by means of reacting the corresponding halohydrin with alkaline acting substances such as e.g. alkali metal hydroxide can be used immediately if the alkali halogenide produced thereby in the final product is not susceptible of creating a risk of corrosion. The latter product so obtained is neither washed nor neutralized and can be used directly.

The cationization reaction can be performed either in a mixing unit or also after homogenization outside of the mixing unit, in a storage silo or in the appropriate packages provided for shipment.

If the reaction is to take place in a mixing unit, yields of 40–60% are achieved after 6 to 24 hours at 30° to 60° C.

However, the preferred embodiment proceeds as follows: The reaction mixture is homogenized at 5° to 40° C. in an intensive mixer within 10 seconds to 25 minutes, then removed and the cationization reaction is allowed to proceed to the end in the provided storage container such as e.g. a silo at the same temperatures.

It has proven to be advantageous in this instance to preferably carry out the reaction under ambient temperature conditions in the manufacturing plant which may fluctuate as a function of seasonal variations; that is, from 18° to 30° C. especially 20° to 25° C.

The cationic galactomannans prepared in accordance with the method of the invention are generally present as a finely divided, dry powder and can be directly used after the reaction.

Especially suitable intensive mixers are e.g. plowshare mixers with one or more knife heads for discontinuous and continuous operation or humidifying flow mixers especially for continuous operation. This equipment is known in the art.

Thus, additional reaction containers are superfluous according to the invention since, after the intensive mixing, the reaction mixture can be filled into the packages provided for shipment or into a storage silo and there react to completion.

The brief dwell time in the mixing unit makes possible at the same time for the dry cationization to be performed in a continuous manner. This is contrasted with the state of the art where only a batchwise cationization was considered feasible due to the long mixing times.

The cationic galactomannans prepared in accordance with the invention are suitable for use in the petroleum, textile, pharmacological, cosmetics and explosives industries as well as in mining and in water treatment.

The use of cationic galactomannans (primarily guar) in the paper industry has proven to be especially advantageous. Bursting pressure, tearing strength, layer resistance, retention, page formation and the distribution of fibers in the manufacture of paper are positively influenced.

In contrast to native guar, cationic guar disperses better and has less of a tendency to cause dewatering problems on a sieve. Also, the material is easier to grind during the manufacture of paper if cationic guar is added. Cationic guar is also suitable as auxiliary dewatering agent and drying accelerator.

The following activator types were used for the cationization of guar (guaran).

TABLE 1

| Type | Activator mixtures Composition (% by weight) |
|---|---|
| PC-#01 | 69.45% sodium metasilicate |
| | 30.55% silica |
| | (spray-dried silica; 190 m²/g) |
| PC-#02 | 40.30% sodium metasilicate |
| | 24.25% calcium hydroxide |
| | 35.45% silica |
| PC-#03 | 72.12% sodium aluminate |
| | 27.88% silica |
| PC-#04 | 33.14% sodium metasilicate |
| | 37.70% sodium aluminate |
| | 29.16% silica |
| PC-#05 | 43.44% sodium aluminate |
| | 22.97% calcium hydroxide |
| | 33.59% silica |

A spray-dried, hydrophilic silica with 190 m²/g spec. surface (BET) was used as silica in all examples.

EXAMPLES 1000 g (5.551 moles) native guar flour (moisture content 10.0%, insoluble nitrogen content 0.477%) was intensively mixed (plowshare mixer) in each instance for 5 min. with the indicated activator and the reagent solution, which contained 210.42 g (corresponding to a theoretical DS of 0.250) 2,3-epoxypropyltrimethyl ammonium chloride in each instance, was sprayed on within 3 min. with the mixer running.

After a further 15 min. mixing time, the reaction material was packed into polyethylene bags and analyzed after 4 days storage time. Mixing and storage were performed at room temperature (20° C.). The yield and the degree of substitution (DS) were determined by nitrogen determination according to Kjeldahl on the washed-out product.

Wash solution: iso-propanol/water (60:40% by wt.).

TABLE 2

| No. | Activator Type | Amount | Reagent solution Amount | pract. DS | Yield |
|---|---|---|---|---|---|
| 1 | PC-#01 | 46.89 g | 472.66 g | 0.1188 | 47.5% |
| 2 | PC-#02 | 40.77 g | 472.85 g | 0.0710 | 28.4% |
| 3 | PC-#04 | 51.12 g | 471.91 g | 0.1064 | 42.6% |
| 4 | PC-#05 | 48.96 g | 473.25 g | 0.1110 | 44.4% |
| 5 | PC-#06 | 42.93 g | 471.52 g | 0.0785 | 31.4% |

The composition of the metasilicate used is: 48±1% $SiO_2$, 51.0±1% $Na_2O$, and that of the aluminate: 52-55% $Al_2O_3$, 37-39% $Na_2O$.

Further variations and modifications of the foregoing will be apparent from the foregoing and are intended to be encompassed by the claims appended hereto.

German priority application No. P 37 26 984.4 is relied on and incorporated herein.

We claim:

1. A method for the dry cationization of galactomannans comprising reacting a galactomannans with an alkylene epoxide in an alkaline medium in the presence of water, at a temperature of 5° to 60° C. in the presence of a finely divided, hydrophilic silica and a member of the group consisting of alkali metal silicates, alkali metal aluminates, alkali metal or alkaline earth metal hydroxides or oxides, alkali metal carbonates, and mixture thereof.

2. The method according to claim 1, further comprising homogenizing the galactomannans in an intensive mixing zone within 10 seconds to 25 minutes, removing the so homogenized reaction mixture and permitting the reaction to go to completion in a storage container.

3. The method according to claim 1, wherein the temperature is from 18° to 30° C.

4. The method according to claim 1, wherein the alkylene epoxide is represented by the formula:

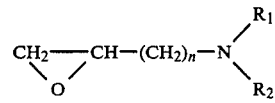

or

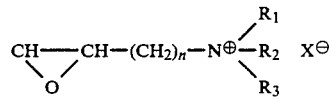

wherein n is an integer of 1, 2 or 3,
$R_1$, $R_2$ and $R_3$ are the same or different alkyl from 1 to 4 carbons, or $R_1$, is benzyl, $X^\ominus$ is chloride, bromide, sulfate or acetate.

5. The method according to claim 1, wherein 0.005 to 0.5 mole epoxide are used per mole of galactomannans.

6. The method according to claim 1, wherein the reaction is carried out in a medium containing 10 to 60% by weight water.

7. The method according to claim 1, wherein the amount of said member is 0.5 to 8% by weight.

8. The method according to claim 1, wherein the silica has a specified surface area of between 60 and 700 m²/g BET.

9. The method according to claim 8, wherein the silica is a precipitated silica with a specific surface area of 190 to 450 m²/g.

10. The method according to claim 1, wherein said silica and said member are added as an activator powder mixture containing 10 to 50% by weight of silica.

11. The method according to claim 1, wherein the pH of the final product is greater than 9.

12. A method for the dry cationization of galactomannans comprising
mixing galactomannans with a powdered activator mixture, said activator mixture being formed of finely divided, hydrophilic silica and an alkaline substance being a member of the group consisting of alkali metal silicates, alkali metal aluminates, alkali metal or alkaline earth metal hydroxides or oxides, alkali metal carbonates, and mixture thereof,
and thereafter spraying said galactomannans and activator with an aqueous solution of an alkylene epoxide, and reacting at a temperature of 5° to 60° C.

13. The method according to claim 12, further comprising homogenizing in an intensive mixing zone within 10 seconds to 25 minutes, then removing and allowing reaction to completion.

* * * * *

UNITED STATES PATENT AND TRADEMARK OFFICE
CERTIFICATE OF CORRECTION

PATENT NO. : 4,940,784
DATED : July 10, 1990
INVENTOR(S) : Reinhard Stober et al.

It is certified that error appears in the above-identified patent and that said Letters Patent is hereby corrected as shown below:

In column 1, in line 8, change "alkylene" to --alkylidene--;

In column 1, in line 44, change "AO" to --A-O--;

In column 1, in line 47, change "AO" to --A-O--;

In column 2, in line 1, change "alkylene" to --alkylidene--;

In column 2, in line 2, change "water the" to --water. The--;

In column 2, in line 23, change "alkylene" to --alkylidene--;

UNITED STATES PATENT AND TRADEMARK OFFICE
CERTIFICATE OF CORRECTION

PATENT NO. : 4,940,784

DATED : July 10, 1990

INVENTOR(S) : Reinhard Stober et al.

It is certified that error appears in the above-identified patent and that said Letters Patent is hereby corrected as shown below:

In column 3, in line 4, change "(v)" to --(V)--;

In column 3, in line 10, change "(Y)" to --(V)--; and

In column 3, in line 62, change "alkylene" to --alkylidene--;

In claim 1, in line 3, change "alkylene" to --alkylidene--;

In claim 4, in line 2, change "alkylene" to --alkylidene--; and

In claim 12, in line 12, change "alkylene" to --alkylidene--.

UNITED STATES PATENT AND TRADEMARK OFFICE
CERTIFICATE OF CORRECTION

PATENT NO. : 4,940,784

DATED : July 10, 1990

INVENTOR(S) : Reinhard Stober et al

It is certified that error appears in the above-identified patent and that said Letters Patent is hereby corrected as shown below:

In claim 12, in line 12, change "alkylene" to --alkylidene--.

Signed and Sealed this

Third Day of November, 1992

Attest:

DOUGLAS B. COMER

Attesting Officer

Acting Commissioner of Patents and Trademarks